May 14, 1929.                      F. BEAL                      1,712,784
                     TELLTALE FOR STOP AND TAIL LIGHTS
                            Filed Aug. 1, 1925
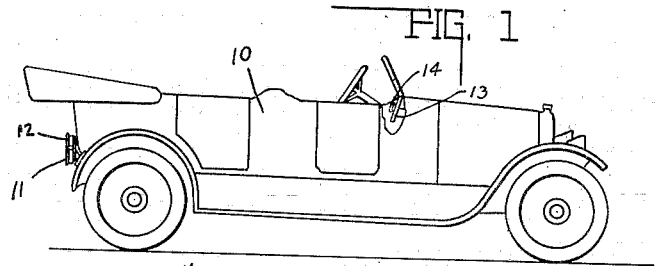
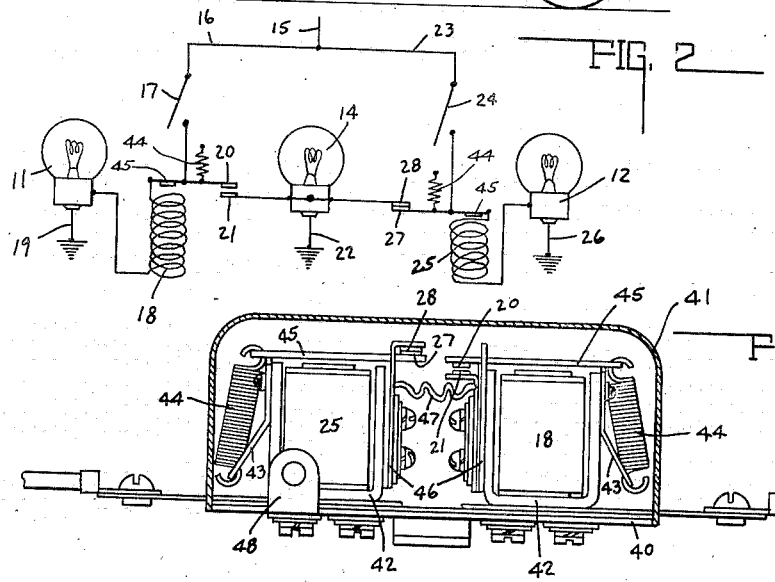
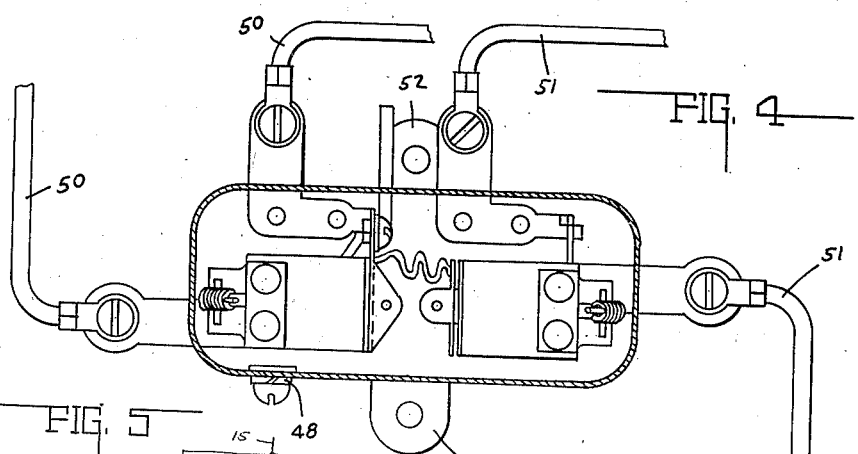
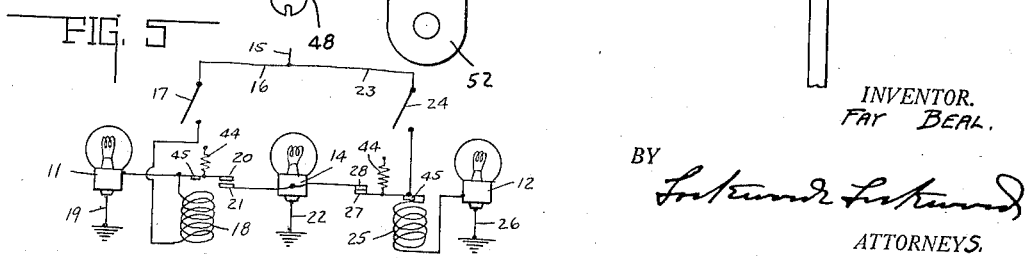
INVENTOR.
FAY BEAL.
BY
ATTORNEYS.

Patented May 14, 1929.

1,712,784

UNITED STATES PATENT OFFICE.

FAY BEAL, OF KOKOMO, INDIANA.

TELLTALE FOR STOP AND TAIL LIGHTS.

Application filed August 1, 1925. Serial No. 47,523.

This invention relates to a tell-tale for stop and tail lights.

The chief object of this invention is to construct a tell-tale and so associate the same with a stop light and a tail light that a single tell-tale lamp will indicate the operative condition of either or both.

The chief feature of the invention consists in the provision of a unitary switch arrangement connected to the stop and tail light circuits for securing the aforesaid operation, said switch being entirely automatic in its action.

Another feature of the invention consists in the utilization of a single lamp for indicating the operative condition of the tail light or the stop light or both.

The full nature of the invention will be understood from the accompanying drawings and the following description and claim:

In the drawings Fig. 1 is a side elevational view of a vehicle showing the tell-tale mounted upon the dash and the stop and tail light on the rear of the vehicle.

Fig. 2 is a wiring diagram of the circuit connections.

Fig. 3 is an elevational view of the automatic switch.

Fig. 4 is a top plan view thereof with the cover removed.

Fig. 5 is a wiring diagram of a modified circuit.

In the drawings 10 indicates a vehicle upon which is mounted a stop light 11 and a tail light 12. On the instrument board 13 or any other suitable convenient location there is mounted a tell-tale lamp 14, and if desired, the automatic switch may be mounted immediately adjacent thereto, or the same may be otherwise mounted.

Reference will now be had to Fig. 2. In this figure the current supply line is indicated by the numeral 15. The branch 16, controlled by a switch 17 suitably actuated, leads to a series relay 18, one terminal of which is connected to the stop light 11. The other terminal of the stop light is grounded as at 19. Thus current flows, when switch 17 is closed, to and thru the stop light from the current supply. Should the stop light be burned out current will not flow from the switch 17 thru the ground 19. In this event current will be impressed up to a series relay 18 but will not flow therethru nor thru a switch movable contact, herein indicated by the numeral 20, and the stationary contact indicated by the numeral 21. These remain open since the relay, solenoid or electromagnet 18 is not energized. This cuts the current supply thru the contacts 20 and 21 to the tell-tale 14 having the ground connection 22. Thus each time that the stop light main control switch 17 is actuated, as by actuation of the clutch thru manual actuation or thru the gear shift lever, or thru the brakes as may be convenient or desirable, the tell-tale lamp 14 will light whenever the stop light 11 lights and both are dark when the stop light fails.

One branch 23 of the current supply line 15 is controlled by a switch 24 which also is connected thru a series relay 25 to the tail light 12 having a ground return. The solenoid or electromagnet 25, when switch 24 is closed, serves to hold the switch member 27 in open circuit position with respect to the stationary contact 28, said last mentioned contact being connected to tell-tale light 14 having the ground return 22. Whenever switch 24 is closed and the tail light 12 is not energized, but burned out for example, current will not flow thru solenoid or electromagnet 25 and the same will not be energized but will permit switch contact 27 to engage contact 28 and supply current to the tell-tale light. Thus, when the main switch to the tail light is closed and the tell-tale light lights, it indicates that the tail light is burned out, or has a poor connection in the circuit.

It will be readily apparent from the foregoing that the tell-tale light is energized automatically upon failure of either the tail light to light and the stop light to light at the desired time.

Since one light is designed for continuous duty and the other for intermittent duty, a single tell-tale light can be associated therewith thru the medium of a normally closed switch and a normally open switch, each being actuated at predetermined time upon failure of the particular circuit including that switch.

In Figs. 3 and 4 there is illustrated one compact operative formation of the automatic switch. In this form of the invention 40 indicates a base closed by a cover 41, in which is mounted a pair of frames 42, these receiving solenoids or electromagnets 25 and 18, respectively. Each frame carries a spring anchorage 43 with which is associated a tension spring 44, the opposite end of which is associated with an armature 45, upon the opposite end of which is mounted one of the electrical contacts and the movable contact of the automatic switch. The stationary contacts 28 and 21 are carried by plates 46 electrically connected by the line 47 in turn connected to the bracket 48, which bracket 48 is adapted to transmit the energy to the tell-tale light. The lines 50 are the terminals leading from the solenoid or electromagnet 25 to the switch 24 and tail light 12. The terminals 51 are those associated with the stop light 19 and the switch 17. The tongues 52 serve as a mounting for the switch construction. The several parts are suitably insulated from each other.

In Fig. 5 a modified form of wiring diagram is disclosed and in this figure it will be noted that solenoid 18 is interposed ahead of the junction between the switch point 20 and the light 11. Otherwise the circuit remains the same. It will be apparent from an inspection of the diagram that the operation of the device is exactly the same as that disclosed in Fig. 2, since when current is passed thru the coil, switch 20 remains open and the tell-tale light does not light. In this form the current for the tell-tale light under normal operative conditions passes thru the solenoid 18, whereas in the form as shown in Fig. 2 such is not the case. If desired, in either of the modifications shown in Figs. 2 and 5, or both, an additional switch may be interposed immediately preceding the tell-tale light 11. Such a construction would be of considerable utility where 11 would indicate a parking light and 14 would indicate a dash tell-tale light, in which event the dash light would be dispensed with, and if desired an additional switch may be interposed between the switch points 20 and 21 and the tell-tale light 14 so that the dash light would not be operated even though its switch was in a closed switch operative condition. All of the foregoing modifications, however, are those well within the skill of the electrician and in nowise effect the broad features of the invention as set forth in the appended claim.

The invention claimed is:

In combination with a pair of signal lights, one for continuous duty and one for intermittent duty, a single source of energy, a main switch controlling each light, and a single tell-tale light illuminatable upon failure of the continuous signal to indicate said failure and darkened condition thereof and illuminatable upon operation of the intermittent light to indicate the illuminated condition thereof, of a coil interposed between each signal light and its main switch including said tell-tale, a shunt circuit around each coil and light and interposed between each main switch and the coil controlled thereby, and a switch in each of the said shunt circuits responsive to coil operation, the switch in the shunt circuit for the continuous duty lamp being open when said lamp is illuminated and the switch in the shunt circuit for the intermittent duty lamp being closed when said lamp is illuminated.

In witness whereof, I have hereunto affixed my signature.

FAY BEAL.